(12) United States Patent
Desmond et al.

(10) Patent No.: US 7,813,024 B2
(45) Date of Patent: Oct. 12, 2010

(54) EC MIRROR ASSEMBLY

(75) Inventors: John P. Desmond, County Kildare (IE); Garret Coady, Dublin (IE); John P. Drummond, County Dublin (IE); Martin McGarry, Dublin (IE); Patrick J. Dowling, County Kildare (IE); Sean Fletcher, Dublin (IE); David Powell, Dublin (IE)

(73) Assignee: Magna Donnelly Engineering, GmbH (DE)

( * ) Notice: Subject to any disclaimer, the term of this patent is extended or adjusted under 35 U.S.C. 154(b) by 83 days.

(21) Appl. No.: 12/093,709

(22) PCT Filed: Nov. 17, 2006

(86) PCT No.: PCT/EP2006/011060
§ 371 (c)(1),
(2), (4) Date: Dec. 19, 2008

(87) PCT Pub. No.: WO2007/057206
PCT Pub. Date: May 24, 2007

(65) Prior Publication Data
US 2009/0097097 A1  Apr. 16, 2009

(30) Foreign Application Priority Data
Nov. 18, 2005  (IE) .............................. S2005/0769

(51) Int. Cl.
G02F 1/15 (2006.01)
G02F 1/153 (2006.01)

(52) U.S. Cl. .................. 359/265; 359/267; 359/272; 362/140; 362/494; 340/815.4; 439/861; 439/862

(58) Field of Classification Search ......... 359/265–275, 359/601–604, 632, 839, 844, 872; 340/425.5, 340/438, 461, 475, 815.4; 362/140, 494; 439/816, 830, 861; 250/205, 225.25, 239
See application file for complete search history.

(56) References Cited

U.S. PATENT DOCUMENTS

| | | | | |
|---|---|---|---|---|
| 6,062,920 A | * | 5/2000 | Jordan et al. | 439/861 |
| 6,064,509 A | * | 5/2000 | Tonar et al. | 359/272 |
| 6,441,943 B1 | * | 8/2002 | Roberts et al. | 359/267 |
| 6,657,767 B2 | * | 12/2003 | Bonardi et al. | 359/265 |
| 7,110,156 B2 | * | 9/2006 | Lawlor et al. | 359/265 |
| 7,209,278 B2 | * | 4/2007 | Lawlor et al. | 359/265 |
| 7,334,922 B2 | * | 2/2008 | Bonardi et al. | 362/494 |
| 2004/0070857 A1 | | 4/2004 | Bonardi et al. | |

FOREIGN PATENT DOCUMENTS

WO  03095269  11/2003

OTHER PUBLICATIONS

Search Report and Written Opinion for corresponding PCT Application No. PCT/EP2006/011060, filed Nov. 17, 2006.

* cited by examiner

*Primary Examiner*—Loha Ben
(74) *Attorney, Agent, or Firm*—Van Dyke, Gardner, Linn & Burkhart, LLP

(57) ABSTRACT

The present invention provides an EC mirror assembly including an EC mirror cell and a control for controlling the reflectivity of the mirror cell, the assembly also including a pair of contact elements independently displaceable relative to the mirror cell while maintaining an electrical connection with the control, the contact elements also being engageable with opposite edges of the mirror cell in order to provide an electrical connection between the control and the mirror cell.

21 Claims, 4 Drawing Sheets

EC MIRROR ASSEMBLY

FIELD OF THE INVENTION

The present invention is concerned with an electro-optical (EO) vehicular rear view mirror assembly such as an electrochromic (EC) vehicular rear view mirror assembly, and in particular an interior vehicular rear view mirror assembly, which is modular in nature in order to be adaptable for use with a range of mirror sizes and shapes, for example varying in size and/or specification or luxury level, in order to reduce the overall cost of designing and/or manufacturing such a range of mirrors.

BACKGROUND OF THE INVENTION

Electro-optic rearview mirrors are well known in the art, for example as described and shown in U.S. Pat. Nos. 5,140, 455; 5,515,816 and 5,659,423 (the entire disclosures of which are hereby incorporated by reference herein). Electro-optic and, in particular, electrochromic (EC) mirrors are now in general usage in vehicles, particularly at the upper end of the market. EC mirrors are relatively expensive and the cost can hinder affordability for vehicles at the medium and lower end of the market. Such EC mirrors, however, confer considerable advantage over known prismatic mirrors and it is, therefore, desirable to reduce the cost of production of electro-optic mirrors so that they can be used in a broad range of vehicle types. There is thus a need for a rearview mirror that is economical to produce but which meets the expectations of the automobile market in terms of functional performance, such as vibration, safety regulations and, in particular, ease and/or speed of assembly at an auto company, in particular in terms of electrical and/or mechanical connections between the constituent components.

SUMMARY OF THE INVENTION

According to a first aspect of the present invention there is provided an EC mirror assembly comprising an EC mirror cell; control means for controlling at least the reflectivity of the mirror cell; and a contact member for providing an electrical connection between the control means and the mirror cell; characterised in that the contact member may be displaced towards and away from an edge of the mirror cell while maintaining an electrical connection with the control means.

Preferably, the contact member comprises a pair of contact elements independently displaceable relative to a respective edge of the mirror cell.

Preferably, each contact element comprises a first end for contacting a terminal of the control means, and a second end for contacting the respective edge of the mirror cell.

Preferably, the second end of each contact element comprises at least one resilient finger which may be resiliently biased against the respective edge of the mirror cell in order to maintain an electrical connection therewith.

Preferably, the second end of each contact element comprises a pair of resilient fingers.

Preferably, the assembly comprises a guideway along which the pair of contact elements are displaceable.

Preferably, the guideway comprises a pair of guideways, one for each contact element.

Preferably, the or each guideway comprises locking means operable to releasably lock each of the contact elements in one of a plurality of positions.

Preferably, the assembly comprises a connector for effecting external electrical connection to the control means.

Preferably, the assembly comprises a housing for receiving the control means.

Preferably, the guideway is formed integrally with the housing.

Preferably, the control means comprises a microchip assembly comprising a pair of photo-sensor elements, both photo-sensor elements facing in substantially the same direction.

Preferably, the housing comprises a pair of windows optically coupled with the pair of photo-sensor elements.

Preferably, the housing is adapted to receive and retain a light-pipe in optical coupling with one of the windows.

Preferably, the assembly comprises a mounting zone adapted to facilitate the mounting of the assembly to a vehicle windshield.

Preferably, the housing is fixed to the mirror cell at the mounting zone.

Preferably, the assembly comprises a printed circuit board on which the control means are substantially provided, the printed circuit board being positioned such that the contact member is substantially located between the printed circuit board and the mirror cell.

Preferably, the printed circuit board comprises a pair of openings through which the contact elements project to contact the terminals of the control means.

Preferably, each terminal is located about the respective opening in the printed circuit board.

Preferably, each opening comprises an elongate slot.

Preferably, the assembly comprises at least one additional zone selected from the group comprising a light zone, a button zone, a compass zone, a communications zone, a remote control zone and a display zone.

According to a second aspect of the present invention there is provided an EC mirror assembly comprising an EC mirror cell; control means for controlling at least the reflectivity of the mirror cell; and a contact member for providing an electrical connection between the control means and the mirror cell; characterised in that the contact member is capable of effecting and maintaining electrical contact with an edge of the mirror cell in the absence of additional securing means.

According to a third aspect of the present invention there is provided a control system for an EC mirror, the system comprising a microchip assembly comprising a pair of photosensor elements, both photosensor elements facing in substantially the same direction.

Preferably, the system comprises a light pipe in optical coupling with one of the photo-sensors.

BRIEF DESCRIPTION OF THE DRAWINGS

The present invention will now be described with reference to the accompanying drawings, in which.

DETAILED DESCRIPTION OF THE DRAWINGS

Figure 1:
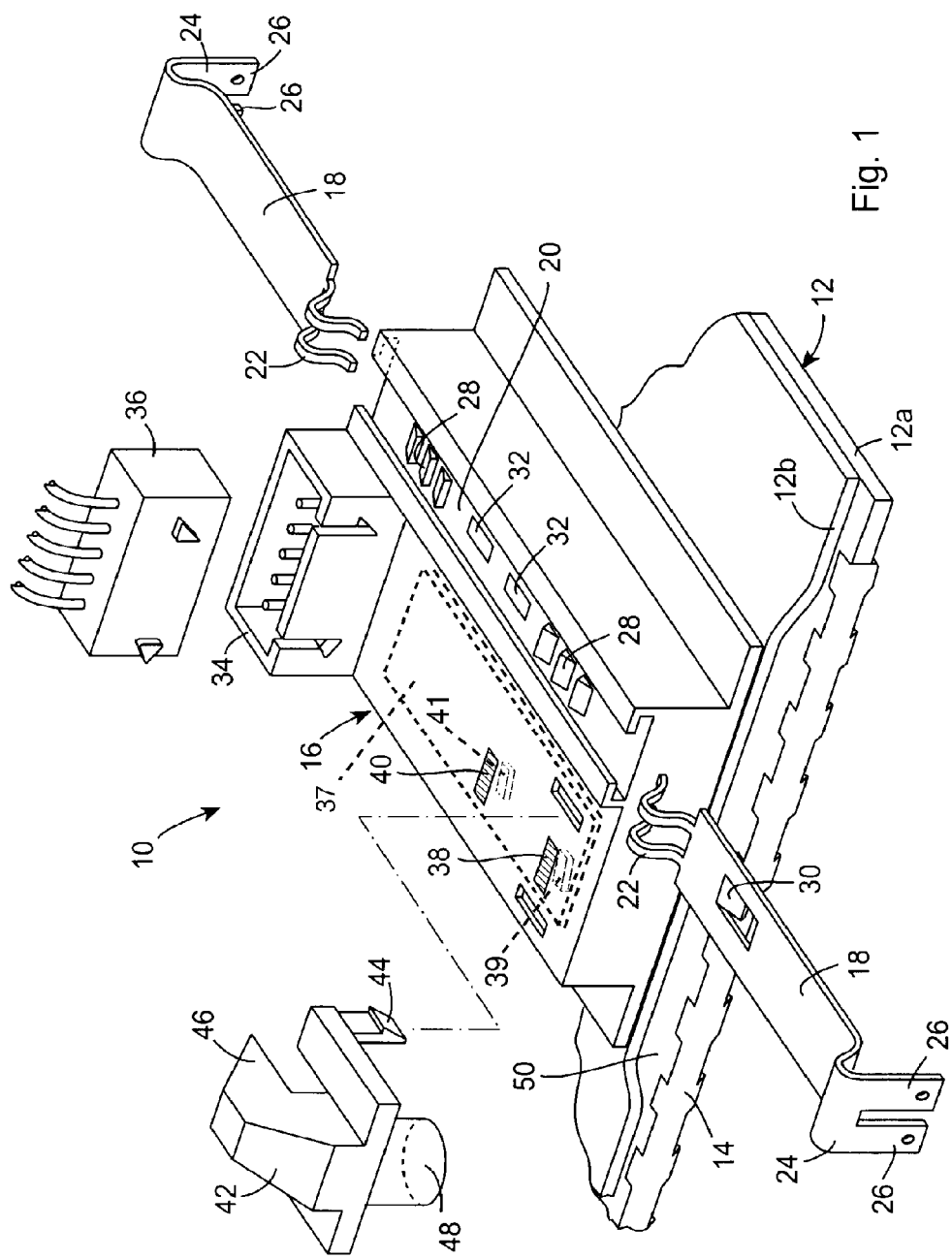
FIG. 1 illustrates a perspective view of an interior of a rearview mirror assembly according to one embodiment of the present invention.

Referring now to FIG. 1 of the accompanying drawings, there is illustrated the interior of a rearview mirror assembly according to one aspect of the present invention, generally indicated as 10. The assembly 10 will, in use, be suitably encased in a plastic housing or the like, the details of which need not be discussed for the purposes of understanding the configuration and operation of the present invention.

The assembly 10 comprises a mirror cell 12 comprising front and rear glass plates 12a, 12b respectively, with a layer of an electro-optic medium (not shown) sandwiched between them, as is well known in the art. The front plate 12a is transparent and the rear plate 12b has a layer of silver or other reflective material.

The assembly 10 is positioned during use, such that the front plate 12a is exposed to the driver of a vehicle, so that the reflective layer on the rear plate 12b is viewed through the front plate 12a and the layer of electro-optic medium. The inside surface of each plate 12a, 12b bears an electrically conductive electrode layer (not shown), the electrode layer on the front plate 12a being transparent and the electrode layer on the rear plate 12b also being transparent, at least if it is in front of the reflective layer (alternatively, the reflective layer may also constitute the electrode layer for the rear plate, so avoiding the need for a separate electrode layer in the rear plate). The light transmissivity of the electro-optic medium, and hence the reflectivity of the mirror cell 12, can be varied by the application of a variable control voltage across the electro-optic medium, i.e. across the conductive electrode layers on the inside surfaces of the plates 12a, 12b. The electro-optic medium may comprise any material, for example electrochromic or liquid crystal, which has the desired electro-optic properties.

The mirror cell 12 is preferably an electrochromic (EC) cell, either of the solid state type or electrochemichromic type, but may be any desired form of cell. The construction of EC cells is well-known in the art, for example as described in U.S. Pat. No. 5,572,354, the entire contents of which are incorporated herein by reference.

The front and rear plates 12a, 12b are of roughly the same size, but have a small vertical off-set, so that the upper edge of the rear plate 12b projects slightly above the upper edge of the front plate 12a and, correspondingly, the lower edge of the front plate 12a projects slightly below the lower edge of the rear plate 12b. The reason for this off-set is to expose a narrow strip of the conductive electrode layer on the inside surface of the rear plate 12b at the top of the mirror cell 12 and a corresponding narrow strip of the conductive electrode layer on the inside surface of the front plate 12a at the bottom of the mirror cell 12. These exposed strips are electrically connected to a respective electrode contact 14 (only bottom one illustrated in FIG. 1), which are essentially elongated toothed clips having a generally U-shaped cross-section and which clip over the exposed edges of the front and rear plates 12a, 12b respectively. It will be appreciated that the vertical offset could be opposite to that shown, such that the rear plate 12b projects outwardly beyond the front plate 12a.

The assembly 10 further comprises control means 37 for controlling the operation of the mirror cell 12, which control means are located, in the embodiment illustrated, within a housing 16 which is positioned at a mounting zone of the assembly 10. The mounting zone is positioned substantially centrally of the mirror cell 12, and in use will normally carry either a ball or socket member (not shown) to enable the mirror assembly 10 to be mounted to a vehicle windshield or the like. Thus in the embodiment illustrated, the housing 16 essentially defines this mounting zone, and the abovementioned ball or socket member could then be mounted to or formed integrally with the housing 16.

The housing 16 defines an interior enclosure (not shown) which receives and retains the control means 37, preferably in the form of a printed circuit board comprising an electrical circuit for controlling the operation of the mirror cell 12, in particular by varying its reflectivity in response to the signals from a pair of photo-sensors 39, 41 mounted on the printed circuit board, as will be described in greater detail hereinafter.

The control means must, therefore, be in electrical contact with the pair of electrode contacts 14, in order to be capable of varying the voltage applied across the electro-optic medium sandwiched between the front plate 12a and rear plate 12b. In a conventional EC mirror, this electrical connection would be achieved by means of fixed electrodes extending from the printed circuit board (or remote terminals thereof) to the electrode contacts 14, and which would normally be soldered or otherwise secured to the electrode contacts 14, in order to ensure a robust mechanical contact therewith, and therefore a reliable electrical connection. However, in the assembly 10 of the present invention, the electrical connection between the control means and the electrode contacts 14 is provided by a contact member in the form of a pair of contact elements 18, each of which is displaceable relative to the mirror cell 12, and preferably displaceable towards and away from a respective edge of the mirror cell 12, as described in greater detail hereinafter. In the embodiment illustrated, each contact element 18 is slideably mounted within a guideway 20, formed integrally with or mounted on the housing 16, or otherwise provided on the assembly 10. In this way each contact element 18 is displaceable along a fixed path towards and away from a respective edge of the mirror cell 12. Each contact element 18 comprises a first end 22 for contacting a respective terminal 32 of the control means, located roughly centrally of the guideway 20, each of the terminals 32 being wired or otherwise electrically connected to the control means located within the housing 16. The contact elements 18 further comprise a second end 24 which, in the embodiment illustrated, comprises a pair of resiliently deformable fingers 26, which are engageable against the respective electrode contact 14, in order to provide an electrical path between each terminal 32 and the corresponding electrode contact 14. It is however envisaged that the electrode contact 14 at each edge of the mirror cell 12 could be omitted, and each contact element 18 arranged to directly contact the exposed narrow strip (not shown) of the conductive electrode layer at the respective edge of the mirror cell 12.

By virtue of the guideway 20, the pair of contact elements 18 may be displaced towards or away from one another, along a fixed path, in order vary the distance between the fingers 26 of the opposed contact elements 18, such as to be capable of accommodating different widths of mirror cell 12. In the embodiment illustrated, each contact element 18 is displaceable in a direction which is substantially perpendicular to a longitudinal axis of the mirror cell 12.

Locking means in the form of a ratchet 28 located within the guideway 20, and a corresponding pawl or barb 30 on each contact element 18 (not shown on the upper contact element 18), allow each contact element 18 to be releasably locked in one of a plurality of possible positions. The locking means could of course take any other suitable form, and is a preferred but not essential feature.

It will therefore be appreciated that each of the contact elements 18, once located within the guideway 20, can be quickly and easily displaced inwardly until the pair of fingers 26 engage against the respective electrode contact 14. Once each contact element 18 has been positioned such that the respective pair of fingers 26 lightly engages the electrode contact 14, each contact element 18 is displaced further along the guideway 20, such that the respective pawl 30 engages the next inboard ratchet 28. In order to allow this additional inward displacement of the contact element 18, the pair of fingers 26 will have been resiliently deformed. The pair of fingers 26 will therefore exert a moderate force against the electrode contact 14, essentially clamping the pair of fingers 26 against the electrode contact 14. In this way, a robust electrical connection is effected and maintained between each contact element 18 and the respective electrode contact 14, in the absence of any adhesive such as solder or the like, although it will be appreciated that such an adhesive could be applied as an extra measure. As a further alternative, the pair of fingers 26 could be resistance-welded to the electrode contact 14. As an additional alternative, the pair of fingers 26 could be soldered to the electrode contact 14.

It will be appreciated that the arrangement of the guideway 20 and sliding contact elements 18, by virtue of the adjustable reach of the contact elements 18, facilitates a "one size fits all" arrangement, applicable across a range of mirror cells of different size/shape. Thus, this arrangement can significantly reduce the cost of manufacture of a range of mirrors, by eliminating the need for the manufacture of custom-sized/shaped electrodes (not shown) and associated fittings for use in each different mirror. In addition, the combination of the guideway 20 and contact elements 18 will reduce the assembly time of the mirror assembly 10, as once the guideway 20 is fitted to the mirror cell 12, in the embodiment illustrated by virtue of mounting the housing 16 to the mirror cell 12, the pair of contact elements 18 can be quickly and easily slid towards one another until the mirror cell 12 is clamped therebetween.

In addition, as the control means 37 is located within the housing 16, and wired to the pair of terminals 32, the housing 16 containing the control means and all of the necessary electrical connections, can be provided to the assembly line as a single prefabricated module, thereby allowing the housing 16 to be simply fixed in place on the mirror cell 12, and the contact elements 18 then clamped against the electrode contacts 14. This gives a "plug and play" or modular arrangement, greatly simplifying the final assembly of the EC mirror assembly 10.

To further reduce the time and effort taken to assemble the EC mirror assembly 10, a socket 34 is preferably provided on the housing 16, providing all of the necessary electrical connections into the control means 37 and any other circuitry contained within the housing 16. A corresponding plug 36 can then be provided to connect the mirror assembly 10 to a power supply and/or control circuitry (not shown) of a vehicle to which the mirror assembly 10 is to be fitted. Thus, all of the necessary connections between the vehicle and the mirror assembly 10 can be achieved by simply connecting the plug 36 to the socket 34.

In order to establish a reflectance level of the electro-optic reflective element (not shown) sandwiched between the front plate 12a and rear plate 12b, the control means 37 includes a pair of photo-sensors 39, 41 to sense light conditions in a particular light environment. Improvements to these photo-sensors will be discussed hereinafter in greater detail. One of the photo-sensors is adapted to be a forward-detecting (i.e. facing in the direction of travel of the vehicle when driving) ambient sensor, while the other photo-sensor is a adapted to be a rearward-detecting (i.e. detecting light incident from the direction of travel of the vehicle when driving) glare sensor (that detects glare from headlights of vehicles approaching from the rear of the vehicle). These photo-sensors may be photo-transistors, photo-diodes, photo-resistors, multi-pixel sensors, CMOS photo-sensors or the like. One of the photo-sensors is optically coupled with a first window 38 in the housing 16, while the second photo-sensor is optically coupled with a second window 40 in the housing 16. A light pipe 42 is mountable to the housing 16, in order, in use, to direct light incident from the rear of the vehicle onto the first photo-sensor, via the first window 38. In this way, when manufacturing the control means, which will generally be comprised of a PCB, it is possible to build a standard circuit board and populate it with the two photo-sensors mounted on the same side (i.e. a common side) of the PCB, and so enhance the ease and economy of manufacture, and again reduce the overall cost and complexity of the mirror assembly 10. The light pipe 42 could of course be oriented to direct light from any other direction.

The light pipe 42 is provided with a pair of clips 44 which enable the light pipe 42 to be quickly and easily secured and optically coupled to the housing 16. When the light pipe 42 is fixed to the housing 16, a first end 46 thereof is optically coupled with the first window 38, while a second end 48 of the light pipe 42 is seated within and optically coupled to a recess 50 formed between the front plate 12a and the rear plate 12b of the mirror cell 12. The use of the light pipe 42 in this capacity is described and shown in detail in US Patent Application Publication No. US2003043589, and International Application WO03/095269, the details of which are incorporated herein by reference. Thus the light pipe 42 enables light incident from behind the vehicle (for example from the headlights of a following vehicle) to be transmitted, through the front plate 12a, via the light pipe 42, to the first photo-sensor. Ambient light from outside the vehicle can be transmitted in known manner, through the second window 40, to the second photo-sensor, thereby allowing the control means, utilising suitable logic, to determine a suitable reflectance level for the mirror cell 12 as is known in the art.

Returning to the pair of photo-sensors themselves, the present invention provides said pair of photo-sensors 39, 41 on a single chip, such as a silicon wafer/chip or the like, as opposed to an individual chip for each photo-sensor. The photo-sensors may comprise, for example, a photo-transistor or a photo-diode junction created on a silicon substrates (and preferably with both commonly created on the same side and adjacent one another), or (and less preferably) may be a photo-resistor element such as a thick film paste of cadmium sulphide on a suitable substrate. Once the two photo-sensors have been mounted on the single chip, the chip is encapsulated or potted in a suitable protective coating or material or potting material, while leaving suitable light transmitting apertures to allow external optical coupling to the two photo-sensors. The two photo-sensors are positioned on the single chip to face in substantially the same direction (and a light conduiting member or light guide can be used to bring in light to one of the photo-sensors from an opposing direction than what the two face). The use of a single chip or integrated circuitry package or component incorporating the two photo-sensors greatly simplifies the manufacture of the control means of the EC mirror assembly 10 of the present invention, while simultaneously reducing the cost thereof.

The photo-sensors, which are preferably formed from silicon, are sensitive both to visible light and to near and far infra-red electromagnetic radiation. Thus it is desirable to use a spectral filter to reduce the amount of infra-red radiation incident on the photo-sensor. For example, a near-IR attenuating filter, having a high extinction band in the about 660 nm to about 1200 nm range, can be placed in front of a semiconductor photo-sensor. Preferably, such spectral filters have at least about 60% visible light transmission and have less than about 10% transmission in the near infra-red spectral region. Also, near infra-red absorbing filters can be formed by incorporation of near infra-red dyes into a polymer structure, such as into polycarbonate or polystyrene or acrylic or polyester or acrylate or CR39 or a COC polyolefin or another similar optical polymer. Such dyes typically comprise metal inorganic material such as nickel complexes and the like. The near-IR attenuating filter may be a separate component in the assembly. For example, a plug of suitable material (not shown) could be positioned over the photo-sensors in a custom formed cavity or recess provided in the protective coating of potting material surrounding the photo-sensors. Alternatively, the filter could be incorporated into the light pipe 42. In addition, IR absorption material or dyes may be directly included in the encapsulant material of the photo-sensors, as opposed to being a separate plug of material.

To further improve the modular nature of the mirror assembly 10, in addition to the mounting zone defined by the housing 16 in the present embodiment, the assembly 10 preferably comprises at least one and, more preferably, a number of additional zones, such as a light zone, a button zone, a compass zone, a communication zone, a remote control zone and a display zone, most preferably distributed about the surface defined by the rear of the mirror cell 12. Each zone preferably includes mounting means (not shown), for example plastic staking or pins, to receive the associated components in each zone. The light zone may be positioned on the rear of the mirror cell 12, to receive a cabin light and associated circuitry (not shown), while the display zone may be positioned to be located at a passenger side of the mirror assembly 10, to include an LCD display or the like, visible through the front plate 12a of the mirror cell 12. A microphone and/or speaker (not shown) may be mounted in the communication zone, in order to provide the possibility of incorporating a hands-free kit into the mirror assembly 10, if desired. Additionally, a remote control garage door actuator (not shown) or the like may be locatable in a suitably positioned remote control zone on the rear of the mirror cell 12. It will be appreciated that the mirror assembly 10 may include a greater or lesser number of these zones, which are all modular in nature, in order to allow different configurations to be achieved using the same mirror cell 12.

Figure 2:
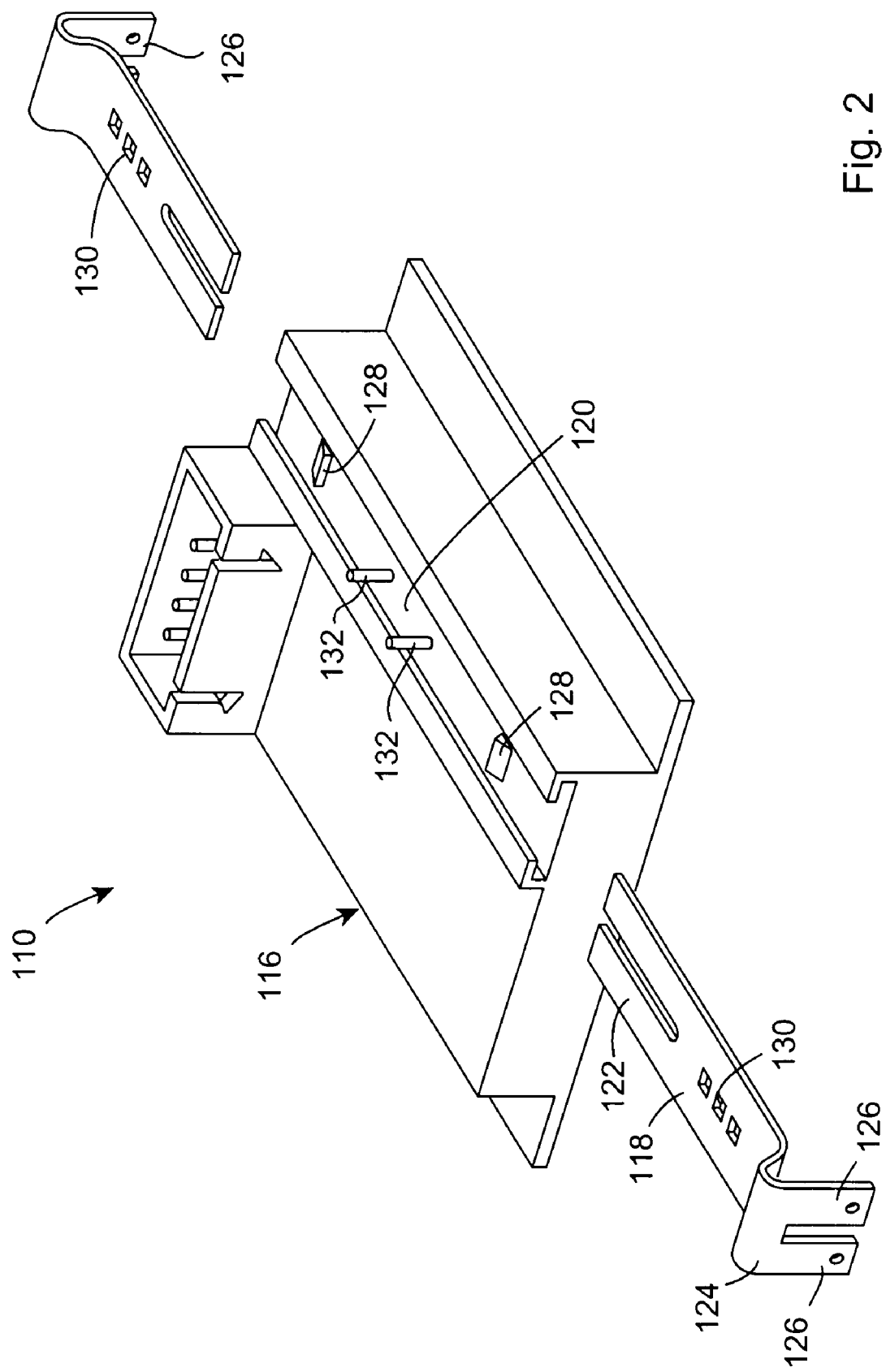
FIG. 2 illustrates a perspective view of an interior of a rearview mirror assembly according to a second embodiment of the present invention.

Turning now to FIG. 2 of the accompanying drawings, there is illustrated a second embodiment of a mirror assembly according to the present invention, generally indicated as 110. In this second embodiment, like components have been accorded like reference numerals, and unless otherwise stated, perform a like function. In this second embodiment, no mirror cell is illustrated, as this embodiment is essentially intended to illustrate an alternative method of mounting a pair of contact elements 118 to a housing 116, for application to any suitable mirror cell (not shown). The housing 116 again incorporates a guideway 120 formed integrally therewith, although the guideway 120 could, of course, be formed separately from the housing 116. Each of the contact elements 118 includes a first end 122 defining a slot for receiving a respective terminal 132, and a second end 124 for contacting an electrode contact (not shown) of a mirror cell. The second end 124 again comprises a pair of resiliently deformable fingers 126. Locking means are provided in the form of a resiliently deformable tooth 128 and a corresponding plurality of apertures 130 on the contact element 118, which together allow the position of the contact element 118 to be releasably locked at various locations.

Figure 3:
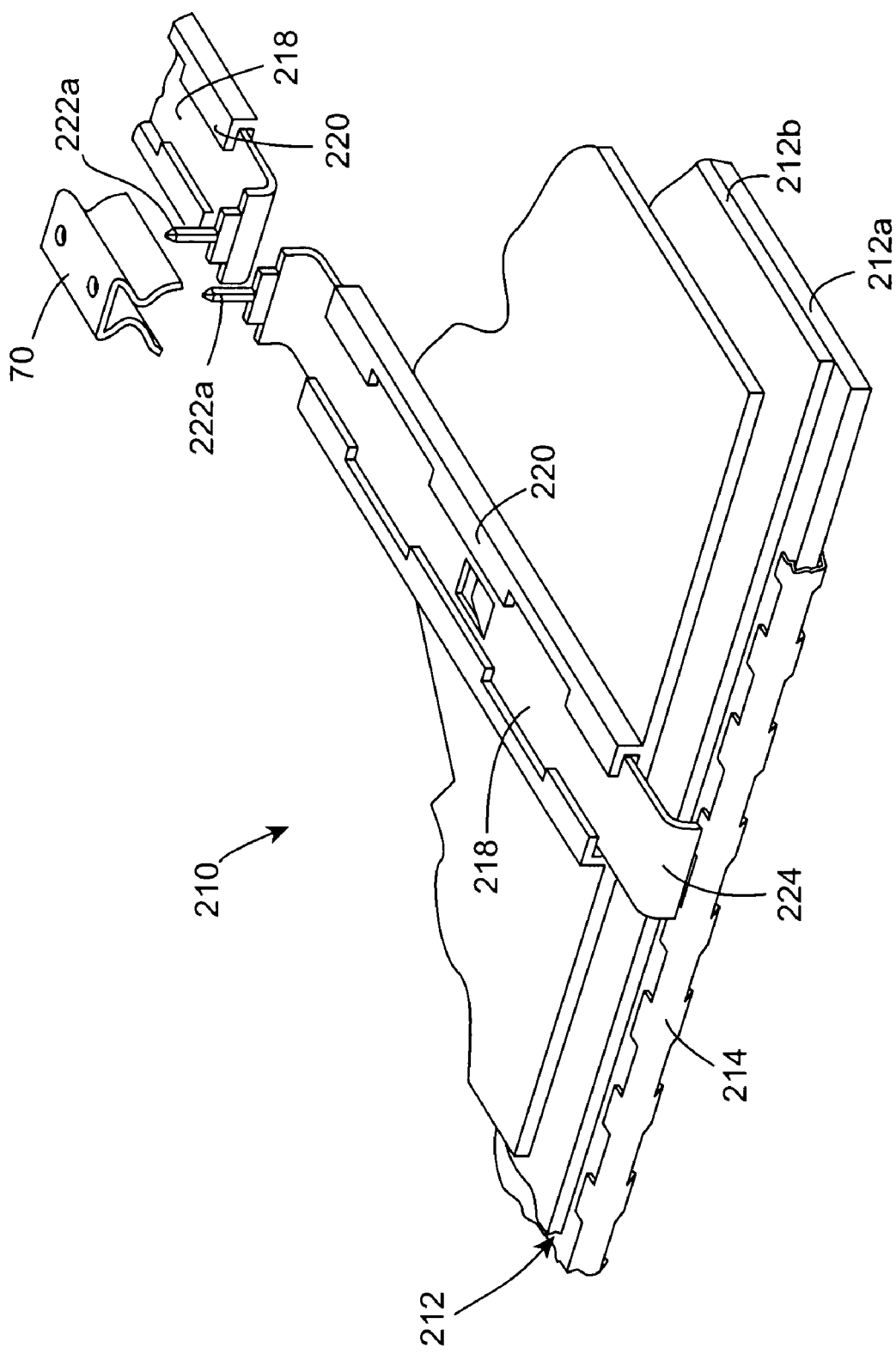
FIG. 3 illustrates a perspective view of an interior of a rearview mirror assembly according to a third embodiment of the present invention.

Referring now to FIG. 3, there is illustrated a third embodiment of an EC mirror assembly according to the present invention, generally indicated as 210. Again, in this third embodiment, like components have been accorded like reference numerals and, unless otherwise stated, perform a like function. The assembly 210 comprises a mirror cell 212 having a front plate 212a and a rear plate 212b, with an electro-optic element disposed therebetween. Mounted on either edge of the mirror cell 212 is an electrode contact 214. The assembly 210 further comprises a pair of contact elements 218, each mounted within a respective guideway 220, which is fixed to the rear of the mirror cell 212 by any suitable arrangement. A first end 222 of each contact element 218 terminates in a upstanding pin 222a, which is slideably engageable, in use, within a receptacle 70, which in use is mounted to, or otherwise electrically connected to, control means (not shown) of the assembly 210, as hereinbefore described with reference to the first embodiment. Thus, the position of a second end 224 of the contact element 218, relative to the mirror cell 212, can be adjusted with the pin 222a remaining within the elongate receptacle 70 and thus maintaining electrical contact therewith. Thus each of the contact elements 218 is displaceable relative to the mirror cell 212, and preferably displaceable towards and away from a respective edge of the mirror cell 212. In this way each contact element 218 is displaceable along a fixed path towards and away from a respective edge of the mirror cell 212. This third embodiment again allows the one combination of contact element 218 and slideway 220 to be used across a range of mirror styles/shapes, reducing the cost and complexity of producing same. As with the first embodiment, it is envisaged that the electrode contact 214 at each edge of the mirror cell 212 could be omitted, and each contact element 218 arranged to directly contact the exposed narrow strip (not shown) of the conductive electrode layer at the respective edge of the mirror cell 212.

Figure 4:
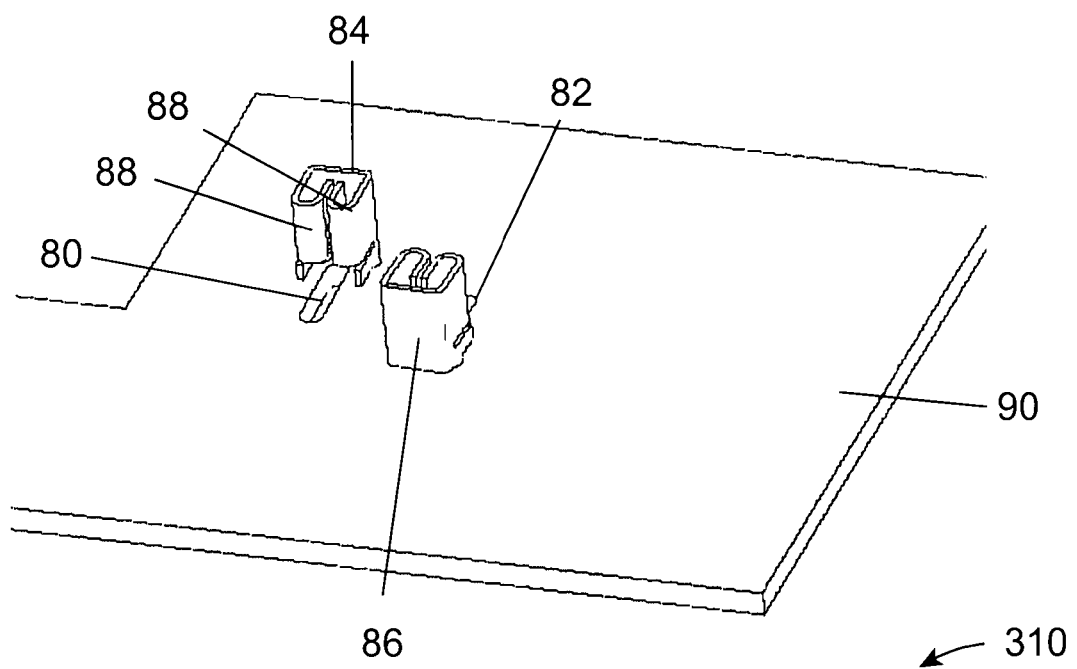
FIG. 4 illustrates a perspective view of an interior of a rearview mirror assembly according to a fourth embodiment of the present invention.
Figure 4:
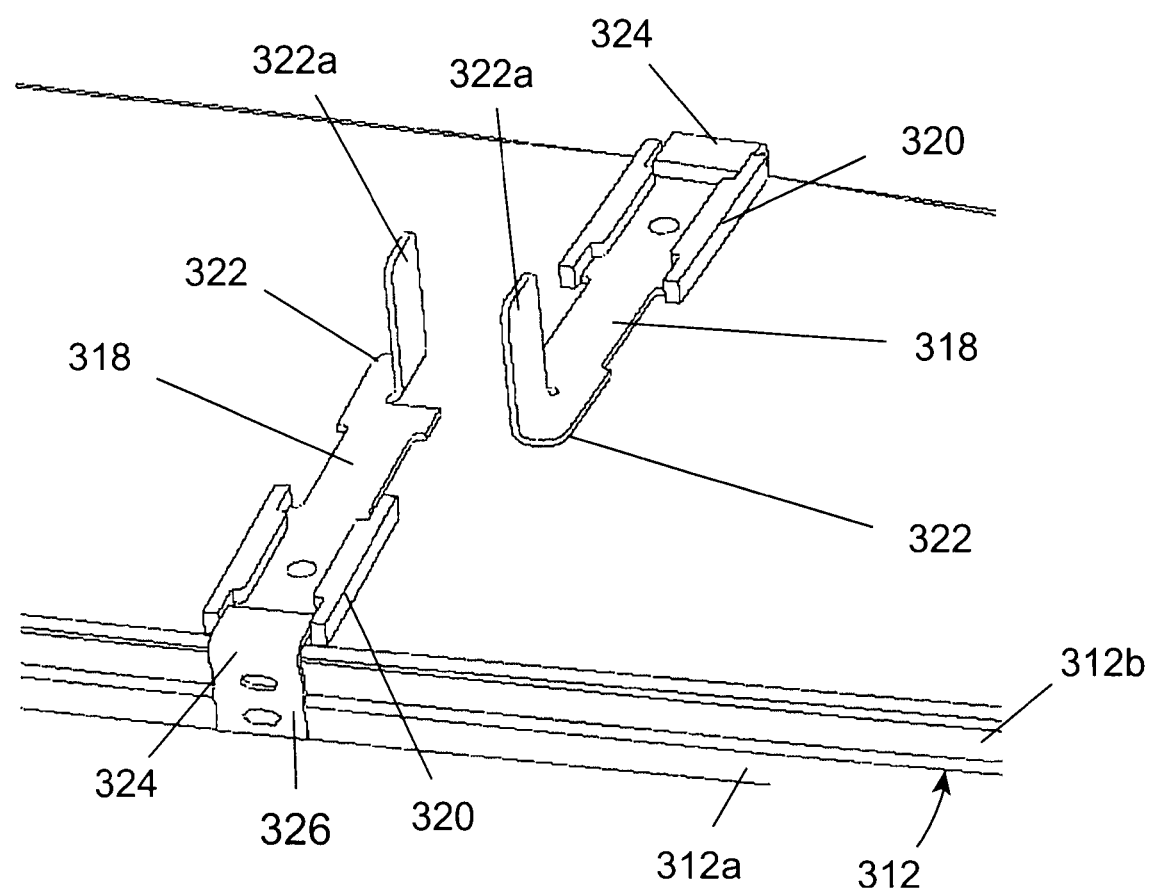

Referring now to FIG. 4, there is illustrated a fourth embodiment of an EC mirror assembly according to the present invention, generally indicated as 310. Again, in this fourth embodiment, like components have been accorded like reference numerals and, unless otherwise stated, perform a like function. The assembly 310 comprises a mirror cell 312 having a front plate 312a and a rear plate 312b, with an electro-optic element (not shown) disposed therebetween. As described above with reference to the first embodiment, the mirror cell 312 may comprise an electrode contact (not shown), for example in the form of an elongated toothed clip having a generally U-shaped cross-section, and which clips over each exposed longitudinal edge of the front and rear plates 312a, 312b.

The assembly 310 also comprises a contact member in the form of a pair of contact elements 318, each slideably mounted within a respective guideway 320, which is fixed to the rear of the mirror cell 312 by any suitable arrangement. By virtue of the guideways 320, the pair of contact elements 318 may be displaced towards or away from one another, in order to accommodate different widths of mirror cell 312. In particular, each of the contact elements 318 is displaceable towards and away from a respective edge of the mirror cell 312. The guideway 320 enables each contact element 318 to be displaceable along a fixed path towards and away from the respective edge of the mirror cell 312.

A first end 322 of each contact element 318 terminates in an upstanding finger 322a which, in use, effects electrical contact with control means (not shown) of the assembly 310, as will be described in greater detail hereinafter. Each contact element 318 also includes a second end 324 having a contact finger 326 which, in use, contacts an edge of the mirror cell 312, in order to provide electrical contact with the electro-optic element (not shown) provided between the front plate 312a and the rear plate 312b, and substantially as described above with reference to the first embodiment. The finger 326 may be resiliently deformable, as described above with reference to the finger 26 of the first embodiment, in order to enable each finger 326 to exert a moderate force against the respective edge of the mirror cell 312, essentially clamping each finger 326 against the mirror cell 312. In this way, a robust electrical connection is effected and maintained between each contact element 318 and the mirror cell 312, in the absence of any adhesive such as solder or the like, although it will be appreciated that such an adhesive could be applied as an extra measure. As a further alternative, the finger 326 of each contact element 318 could be resistance-welded or soldered to the edge of the mirror cell 312.

The control means (not shown) of the assembly 310 is preferably substantially provided on a printed circuit board (PCB) 90 which, in use, is fixed to the rear of the mirror cell 312 by any suitable means. In FIG. 4, the PCB 90 is shown raised off the mirror cell 312, in order to clearly illustrate the arrangement of the sliding contact members 318, as when the PCB 90 is fixed in position, it overlies the contact members 318 and guideways 320. A housing (not shown) or similar cover could subsequently be provided over the PCB 90, in order to enclose same and provide protection against contaminants such as dust/moisture or the like.

As a result of the positioning of the PCB 90 over the contact elements 318, the PCB 90 is provided with a first slot 80 and a second slot 82 therein, which are positioned to correspond with the positions of the upstanding fingers 322a. Mounted to the PCB 90, about the first slot 80 and second slot 82 respectively, are a first terminal 84 and a second terminal 86. The terminals 84, 86 are suitably secured to the PCB 90, and are electrically connected to the control means (not shown). With the PCB 90 fixed in position on the rear of the mirror cell 312, each finger 322a projects through the respective slot 80, 82, and is seated between a pair of arms 88 of each terminal 84, 86. The pair of arms 88 are, in the embodiment illustrated, turned back on one another in order to effectively define a pair of resiliently deformable jaws between which the respective finger 322a is located. The contact between each finger 322a and respective terminal 84, 86 completes the electrical path between the control means (not shown) and the electro-optic medium (not shown) sandwiched between the front plate 312a and the rear plate 312b.

Each of the slots 80, 82 is of sufficient length to permit displacement of the respective finger 322a longitudinally within the slot 80, 82, in order to allow corresponding displacement of each contact element 318. As a result of the configuration and location of each terminal 84, 86, during such displacement of the contact element 318, the finger 222a remains between the pair of arms 88 of the terminal 84, 86 thus maintaining electrical contact therewith. In particular, there is sufficient overlap between the arms 88 of each terminal 84, 86 in order to allow the finger 322a to be displaced along the length of the slot 80, 82 while still being gripped between or located in contact with the pair of arms 88. In order to both allow the fingers 322a to pass through the slots 80, 82, and to be seated between the arms 88 of each terminal 84, 86, the fingers 322a are preferably flattened or plate like in form. It will however be appreciated that the fingers 322a and the terminals 84, 86 could be of any other suitable design which still embodying the above described functionality.

Locking means (not shown), for example similar to the ratchet 28 and pawl 30 arrangement of the first embodiment may be provided on or in association with each contact element 318, allowing each contact element 318 to be releasably locked in one of a plurality of possible positions. The locking means could of course take any other suitable form.

This fourth embodiment again allows the one combination of contact element 318 and slideway 320 to be used across a range of mirror styles/shapes, reducing the cost and complexity of producing same.

It will, therefore, be appreciated that the mirror assembly 10; 110; 210; 310 of the present invention facilitates the possibility of having one or more of the component parts of the assembly 10; 110; 210; 310 manufactured off-site, for example in an overseas manufacturing location, and then shipped to remote mirror assembly plants where the various components may be married, possibly with a locally made mirror housing and any additional accessories, to form a complete interior rear view mirror assembly. In particular the slidable contact elements 18; 118; 218; 318 ensure a quick and reliable electrical connection between the control means and the mirror cell, regardless of the size and/or shape of the particular mirror cell.

The rearview mirror assembly thus may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,406; 5,142,407; 4,824,221; 5,818,636; 6,166,847; 6,111,685; 6,392,783; 6,710,906; 6,798,556; 6,554,843; 6,420,036; 5,442,478; and/or 4,712,879, and/or U.S. patent application Ser. No. 10/054,633, filed Jan. 22, 2002 by Lynam et al. for VEHICULAR LIGHTING SYSTEM, now U.S. Pat. No. 7,195,381; and/or Ser. No. 11/021,065, filed Dec. 23, 2004, now U.S. Pat. No. 7,255,451, and/or International Pat. Publication Nos. WO 2004/098953, published Nov. 18, 2004; WO 2004/042457, published May 21, 2004; WO 2003/084780, published Oct. 16, 2003; and/or WO 2004/026633, published Apr. 1, 2004, which are all hereby incorporated herein by reference, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein.

Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. patent application Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Although shown and described as an electro-optic such as an electrochromic reflective element assembly or cell, the reflective element may comprise a single substrate (and thus only having a first surface and a second surface) with a reflective coating at its rear (second) surface, without affecting the scope of the present invention. For example, the mirror assembly may comprise a prismatic mirror element or other mirror element having a single substrate reflective element, such as a mirror assembly utilizing aspects described in U.S. Pat. Nos. 6,318,870; 6,598,980; 5,327,288; 4,948,242; 4,826,289; 4,436,371; and 4,435,042; and PCT Application No. PCT/US04/015424, filed May 18, 2004 by Donnelly Corporation et al. for MIRROR ASSEMBLY FOR VEHICLE; and U.S. patent application Ser. No. 10/933,842, filed Sep. 3, 2004, now U.S. Pat. No. 7,249,860, which are hereby incorporated herein by reference. Optionally, the reflective element may comprise a conventional prismatic or flat reflective element or prism, or may comprise a prismatic or flat reflective element of the types described in PCT Application No. PCT/US03/29776, filed Sep. 19, 2003 by Donnelly Corp. et al. for MIRROR REFLECTIVE ELEMENT ASSEMBLY; U.S. patent application Ser. No. 10/709,434, filed May 5, 2004 by Lynam for MIRROR REFLECTIVE ELEMENT, now U.S. Pat. No. 7,420,756; Ser. No. 10/933,842, filed Sep. 3, 2004 by Kulas et al. for INTERIOR REARVIEW MIRROR ASSEMBLY, now U.S. Pat. No. 7,249,860; Ser. No. 11/021,065, filed Dec. 23, 2004 by McCabe et al. for ELECTRO-OPTIC MIRROR CELL, now U.S. Pat. No. 7,255,451; and/or Ser. No. 10/993,302, filed Nov. 19, 2004 by Lynam for MIRROR REFLECTIVE ELEMENT FOR A VEHICLE, now U.S. Pat. No. 7,338,177, and/or PCT Application No. PCT/US2004/015424, filed May 18, 2004 by Donnelly Corp. et al. for MIRROR ASSEMBLY FOR VEHICLE, which are all hereby incorporated herein by reference, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (the entire disclosures of which are hereby incorporated by reference herein), that can benefit from the present invention.

Optionally, the mirror assembly may include one or more displays, such as the types disclosed in U.S. Pat. Nos. 5,530,240 and/or 6,329,925, which are hereby incorporated herein by reference, and/or display-on-demand or transflective type displays, such as the types disclosed in U.S. Pat. Nos. 6,690,268; 5,668,663 and/or 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; and/or Ser. No. 11/021,065, filed Dec. 23, 2004 by McCabe et al. for ELECTRO-OPTIC MIRROR CELL, now U.S. Pat. No. 7,255,451; and/or PCT Application No. PCT/US03/29776, filed Sep. 9, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. provisional applications, Ser. No. 60/630,061, filed Nov. 22, 2004 by Lynam et al. for MIRROR ASSEMBLY WITH VIDEO DISPLAY; Ser. No. 60/667,048, filed Mar. 31, 2005 by Lynam et al. for MIRROR ASSEMBLY WITH VIDEO DISPLAY; Ser. No. 60/629,926, filed Nov. 22, 2004 by McCabe et al. for METHOD OF MANUFACTURING ELECTRO-OPTIC MIRROR CELL; Ser. No. 60/531,838, filed Dec. 23, 2003; Ser. No. 60/553,842, filed Mar. 17, 2004; Ser. No. 60/563,342, filed Apr. 19, 2004; Ser. No. 60/681,250, filed May 16, 2005; Ser. No. 60/690,400, filed Jun. 14, 2005; Ser. No. 60/695,149, filed Jun. 29, 2005; and/or Ser. No. 60/730,334, filed Oct. 26, 2005 by Baur for VEHICLE MIRROR ASSEMBLY WITH INDICIA AT REFLECTIVE ELEMENT, and/or PCT Application No. PCT/US03/40611, filed Dec. 19, 2003 by Donnelly Corp. et al. for ACCESSORY SYSTEM FOR VEHICLE, which are all hereby incorporated herein by reference, or may include or incorporate video displays or the like, such as the types described in PCT Application No. PCT/US03/40611, filed Dec. 19, 2003 by Donnelly Corp. et al. for ACCESSORY SYSTEM FOR VEHICLE, and/or U.S. provisional applications, Ser. No. 60/630,061, filed Nov. 22, 2004 by Lynam et al. for MIRROR ASSEMBLY WITH VIDEO DISPLAY; and Ser. No. 60/667,048, filed Mar. 31, 2005 by Lynam et al. for MIRROR ASSEMBLY WITH VIDEO DISPLAY, which are hereby incorporated herein by reference.

Optionally, the mirror assembly may accommodate other accessories or circuitry or the like as well, such as a rain sensor or imaging device or the like. For example, the mirror assembly may include a mounting portion (such as the types described in U.S. patent application Ser. No. 11/226,628, filed Sep. 14, 2005; and/or U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are all hereby incorporated herein by reference), and may include a rain sensor or the like and may position the rain sensor against the windshield, such as described in U.S. Pat. Nos. 6,250,148; 6,341,523; and 6,824,281, and in U.S. patent application Ser. No. 10/023,162, filed Dec. 17, 2001 by Lynam for RAIN SENSOR MOUNT FOR USE IN A VEHICLE, now U.S. Pat. No. 6,516,664; Ser. No. 10/348,514, filed Jan. 21, 2003 by Lynam for RAIN SENSOR MOUNTING SYSTEM, now U.S. Pat. No. 6,968,736; and Ser. No. 10/958,087, filed Oct. 4, 2004 by Schofield et al. for VEHICLE ACCESSORY MODULE, now U.S. Pat. No. 7,188,963, which are all hereby incorporated herein by reference. Optionally, the mirror assembly may include an imaging device, such as an imaging array sensor for imaging systems of the types described in U.S. Pat. Nos. 6,757,109; 6,717,610; 6,396,397; 6,201,642; 6,353,392; 6,313,454; 6,396,397; 5,550,677; 5,670,935; 5,796,094; 5,877,897; 6,097,023; and 6,498,620, and U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149, and Ser. No. 10/427,051, filed Apr. 30, 2003 by Pawlicki et al. for OBJECT DETECTION SYSTEM FOR VEHICLE, now U.S. Pat. No. 7,038,577, which are all hereby incorporated herein by reference.

Optionally, the mirror assembly may be utilized with a video slide-out mirror, such as the types described in PCT Application No. PCT/US03/40611, filed Dec. 19, 2003 by Donnelly Corp. et al. for ACCESSORY SYSTEM FOR VEHICLE, and/or U.S. provisional applications, Ser. No. 60/630,061, filed Nov. 22, 2004 by Lynam et al. for MIRROR ASSEMBLY WITH VIDEO DISPLAY; and Ser. No. 60/667, 048, filed Mar. 31, 2005 by Lynam et al. for MIRROR ASSEMBLY WITH VIDEO DISPLAY, which are hereby incorporated herein by reference. Further, when such a vehicle equipped with such a video mirror is also equipped with a side viewing or front viewing or rear viewing sensor vision system (such as by utilizing a radar sensor or an ultrasonic sensor or a camera sensor (such as described in U.S. patent application Ser. No. 11/239,980, filed Sep. 30, 2005, and/or U.S. provisional applications, Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; Ser. No. 60/618,686, filed Oct. 14, 2004 by Laubinger for VEHICLE IMAGING SYSTEM; and/or Ser. No. 60/638,687, filed Dec. 23, 2004 by Higgins-Luthman for OBJECT DETECTION SYSTEM FOR VEHICLE, which are hereby incorporated herein by reference) to monitor an area adjacent the vehicle), the video screen may automatically extend when such a sensor system detects the presence of an obstacle and/or a human adjacent to the vehicle. Also, the video display screen may extend in conjunction with a trailer-hitch monitoring system (such as the types described in U.S. patent application Ser. No. 10/418,486, filed Apr. 18, 2003 by McMahon et al. for VEHICLE IMAGING SYSTEM, now U.S. Pat. No. 7,005,974, which is hereby incorporated herein by reference) and icons and/or indicia and/or instructions may be created on the video image displayed on the extended video screen of the video mirror to assist or guide the driver to hitch a trailer to the trailer hitch of the vehicle.

Optionally, the mirror assembly may include one or more user actuatable inputs or input devices or human machine interfaces. For example, the inputs or user interfaces may include buttons, such as are described in U.S. Pat. No. 6,501,387, and/or U.S. provisional applications, Ser. No. 60/690,401, filed Jun. 14, 2005; and/or Ser. No. 60/719,482, filed Sep. 22, 2005, which are hereby incorporated herein by reference, or that include touch/proximity sensors such as are disclosed in U.S. Pat. Nos. 6,001,486; 6,310,611; 6,320,282; and 6,627,918, and U.S. patent application Ser. No. 09/817,874, filed Mar. 26, 2001 by Quist et al. for INTERACTIVE AUTOMOTIVE REARVISION SYSTEM, now U.S. Pat. No. 7,224,324, and PCT Application No. PCT/US03/40611, filed Dec. 19, 2003, which are hereby incorporated herein by reference, or that include other types of buttons or switches, such as those described in U.S. patent application Ser. No. 11/029,695, filed Jan. 5, 2005 by Lindahl et al. for MIRROR ASSEMBLY, now U.S. Pat. No. 7,253,723; and/or U.S. provisional applications, Ser. No. 60/556,259, filed Mar. 25, 2004; Ser. No. 60/553,517, filed Mar. 16, 2004; and Ser. No. 60/535,559, filed Jan. 9, 2004; and/or PCT Application No. PCT/US2004/015424, filed May 18, 2004 by Donnelly Corp. et al. for MIRROR ASSEMBLY FOR VEHICLE, which are hereby incorporated herein by reference, or that include fabric-made position detectors, such as are disclosed in U.S. Pat. Nos. 6,504,531; 6,501,465; 6,492,980; 6,452,479; 6,437,258; and 6,369,804, which are hereby incorporated herein by reference. The manual inputs or user actuatable inputs or actuators may control or adjust or activate/deactivate one or more accessories or elements or features. For touch sensitive inputs or applications or switches, the mirror assembly or accessory module or input may, when activated, provide a positive feedback (such as activation of an illumination source or the like, or such as via an audible signal, such as a chime or the like, or a tactile or haptic signal, or a rumble device or signal or the like) to the user so that the user is made aware that the input was successfully activated.

The invention claimed is:

1. An EC mirror assembly comprising:
   an EC mirror cell;
   control means for controlling at least the reflectivity of the mirror cell; and
   a contact member for providing an electrical connection between the control means and the mirror cell;
   wherein the contact member is displaceable towards and away from an edge of the mirror cell while maintaining an electrical connection with the control means.

2. An EC mirror assembly according to claim 1 in which the contact member comprises a pair of contact elements independently displaceable relative to a respective edge of the mirror cell.

3. An EC mirror assembly according to claim 2 in which each contact element comprises a first end for contacting a terminal of the control means, and a second end for contacting the respective edge of the mirror cell.

4. An EC mirror assembly according to claim 3 in which the second end of each contact element comprises at least one resilient finger which may be resiliently biased against the respective edge of the mirror cell in order to maintain an electrical connection therewith.

5. An EC mirror assembly according to claim 3 in which the second end of each contact element comprises a pair of resilient fingers.

6. An EC mirror assembly according to claim 2 in which the assembly comprises a guideway along which the pair of contact elements are displaceable.

7. An EC mirror assembly according to claim 6 in which the guideway comprises a pair of guideways, one for each contact element.

8. An EC mirror assembly according to claim 6 in which the guideway comprises locking means operable to releasably lock each of the contact elements in one of a plurality of positions.

9. An EC mirror assembly according to claim 1 in which the assembly comprises a connector for effecting external electrical connection to the control means.

10. An EC mirror assembly according to claim 1 in which the assembly comprises a housing for receiving the control means.

11. An EC mirror assembly according to claim 10 in which the assembly comprises a guideway and wherein the guideway is formed integrally with the housing.

12. An EC mirror assembly according to claim 1 in which the control means comprises a microchip assembly comprising a pair of photo-sensor elements, both photo-sensor elements facing in substantially the same direction.

13. An EC mirror assembly according to claim 12, in which the assembly comprises a housing for receiving the control means, and in which the housing comprises a pair of windows optically coupled with the pair of photo-sensor elements.

14. An EC mirror assembly according to claim 13 in which the housing is adapted to receive and retain a light-pipe in optical coupling with one of the windows.

15. An EC mirror assembly according to claim 1 in which the assembly comprises a mounting zone adapted to facilitate the mounting of the assembly to a vehicle windshield.

16. An EC mirror assembly according to claim 15, in which the assembly comprises a housing for receiving the control means, and in which the housing is fixed to the mirror cell at the mounting zone.

17. An EC mirror assembly according to claim 1 comprising a printed circuit board on which the control means are substantially provided, the printed circuit board being positioned such that the contact member is substantially located between the printed circuit board and the mirror cell.

18. An EC mirror assembly according to claim 17, in which the contact member comprises a pair of contact elements independently displaceable relative to a respective edge of the mirror cell, and in which each contact element comprises a first end for contacting a terminal of the control means, and a second end for contacting the respective edge of the mirror cell, and in which the printed circuit board comprises a pair of openings through which the contact elements project to contact the terminals of the control means.

19. An EC mirror assembly according to claim 18 in which each terminal is located about the respective opening in the printed circuit board.

20. An EC mirror assembly according to claim 18 in which each opening comprises an elongate slot.

21. An EC mirror assembly according to claim 1 in which the assembly comprises at least one zone selected from the group comprising a light zone, a button zone, a compass zone, a communications zone, a remote control zone and a display zone.

* * * * *